(12) United States Patent
Zeng

(10) Patent No.: US 7,277,101 B2
(45) Date of Patent: Oct. 2, 2007

(54) METHOD AND SYSTEM FOR SCALING IMAGES

(75) Inventor: Steve Zhihua Zeng, Newmarket (CA)

(73) Assignee: ViXS Systems Inc, Toronto, Ontario (CA)

(*) Notice: Subject to any disclaimer, the term of this patent is extended or adjusted under 35 U.S.C. 154(b) by 7 days.

(21) Appl. No.: 10/673,693

(22) Filed: Sep. 29, 2003

(65) Prior Publication Data

US 2005/0068338 A1    Mar. 31, 2005

(51) Int. Cl.
G09G 5/02   (2006.01)
G09G 5/00   (2006.01)
G06K 9/32   (2006.01)

(52) U.S. Cl. ............... 345/600; 345/619; 382/299
(58) Field of Classification Search ............ 345/660, 345/619, 600; 382/299
See application file for complete search history.

(56) References Cited

U.S. PATENT DOCUMENTS

| | | | |
|---|---|---|---|
| 4,866,395 A | 9/1989 | Hosteller | |
| 5,027,203 A | 6/1991 | Samad et al. | |
| 5,093,847 A | 3/1992 | Cheng | |
| 5,115,812 A | 5/1992 | Sano et al. | |
| 5,253,056 A | 10/1993 | Puri | |
| 5,363,213 A * | 11/1994 | Coward et al. | 382/299 |
| 5,475,434 A | 12/1995 | Kim | |
| 5,528,704 A * | 6/1996 | Parker et al. | 382/299 |
| 5,563,950 A | 10/1996 | Easter et al. | |
| 5,594,676 A * | 1/1997 | Greggain et al. | 708/300 |
| 5,602,589 A | 2/1997 | Vishwanath et al. | |
| 5,635,985 A | 6/1997 | Boyce et al. | |
| 5,644,361 A | 7/1997 | Ran et al. | |
| 5,652,749 A | 7/1997 | Davenport et al. | |
| 5,732,391 A | 3/1998 | Fiocca | |
| 5,737,020 A | 4/1998 | Hall et al. | |
| 5,740,028 A | 4/1998 | Sugiyama et al. | |
| 5,844,545 A | 12/1998 | Suzuki et al. | |
| 5,850,443 A | 12/1998 | Van Oorschot et al. | |
| 5,940,130 A | 8/1999 | Nilsson et al. | |
| 5,996,029 A | 11/1999 | Sugiyama et al. | |
| 6,005,623 A | 12/1999 | Takahashi et al. | |
| 6,005,624 A | 12/1999 | Vainsencher | |

(Continued)

FOREIGN PATENT DOCUMENTS

EP    0661826 A2    7/1995

(Continued)

OTHER PUBLICATIONS

Yu, Donghoom, et al., "Fast Motion Estimation for Shape Coding in MPEG-4," IEEE Transactions on Circuits and Systems for Video Technology, vol. 13, No. 4, 2003 IEEE, Apr. 2003, pp. 358-363.

(Continued)

Primary Examiner—Jin-Cheng Wang

(57) ABSTRACT

A system of scaling is disclosed. A data structure is provided including a control word indicative of a number of input pixels associated with a scaling cycle, a number of output pixels associated with a scaling cycle, a number of available phases and a shift variable. Scaling is performed by incrementing a current phase to obtain a adjusted value, decrementing the adjusted value to obtain a second adjusted value, and determining an index value to access a coefficient by right-shifting the second adjusted value.

12 Claims, 4 Drawing Sheets

U.S. PATENT DOCUMENTS

| | | | |
|---|---|---|---|
| 6,014,694 | A | 1/2000 | Aharoni et al. |
| 6,040,863 | A | 3/2000 | Kato |
| 6,081,295 | A | 6/2000 | Adolph et al. |
| 6,141,693 | A | 10/2000 | Perlman et al. |
| 6,144,402 | A | 11/2000 | Norsworthy et al. |
| 6,167,084 | A | 12/2000 | Wang et al. |
| 6,182,203 | B1 | 1/2001 | Simar, Jr. et al. |
| 6,215,821 | B1 | 4/2001 | Chen |
| 6,219,358 | B1 | 4/2001 | Pinder et al. |
| 6,222,886 | B1 | 4/2001 | Yogeshwar |
| 6,236,683 | B1 | 5/2001 | Mougeat et al. |
| 6,259,741 | B1 | 7/2001 | Chen et al. |
| 6,263,022 | B1 | 7/2001 | Chen et al. |
| 6,300,973 | B1 | 10/2001 | Feder et al. |
| 6,307,939 | B1 | 10/2001 | Vigarie |
| 6,314,138 | B1 | 11/2001 | Lemaguet |
| 6,323,904 | B1 | 11/2001 | Knee |
| 6,366,614 | B1 | 4/2002 | Pian et al. |
| 6,385,248 | B1 | 5/2002 | Pearlstein et al. |
| 6,438,168 | B2 | 8/2002 | Arye |
| 6,480,541 | B1 | 11/2002 | Girod et al. |
| 6,526,099 | B1 | 2/2003 | Chistopoulos et al. |
| 6,549,561 | B2 | 4/2003 | Crawford |
| 6,584,509 | B2 | 6/2003 | Putzolu |
| 6,714,202 | B2 | 3/2004 | Dorrell |
| 6,724,726 | B1 | 4/2004 | Coudreuse |
| 6,748,020 | B1 | 6/2004 | Eifrig et al. |
| 2001/0026591 | A1 | 10/2001 | Keren et al. |
| 2002/0106022 | A1 | 8/2002 | Takahashi et al. |
| 2002/0110193 | A1 | 8/2002 | Kyoon et al. |
| 2002/0138259 | A1 | 9/2002 | Kawahara |
| 2002/0145931 | A1 | 10/2002 | Pitts |
| 2002/0196851 | A1 | 12/2002 | Arnaud |
| 2003/0093661 | A1 | 5/2003 | Loh et al. |
| 2003/0152148 | A1 | 8/2003 | Laksono |

FOREIGN PATENT DOCUMENTS

| | | | |
|---|---|---|---|
| EP | 0739138 | A2 | 10/1996 |
| EP | 0805599 | A2 | 11/1997 |
| EP | 0855805 | A2 | 7/1998 |
| EP | 0896300 | B1 | 2/1999 |
| EP | 0901285 | A1 | 2/1999 |
| EP | 0955607 | A2 | 11/1999 |
| EP | 1032214 | A2 | 8/2000 |
| EP | 1087625 | A2 | 3/2001 |
| JP | 07-210670 | A | 8/1995 |
| JP | 07210670 | A | 8/1995 |
| WO | WO 01/95633 | A2 | 12/2001 |
| WO | WO 02/080518 | A2 | 10/2002 |

OTHER PUBLICATIONS

Pyun, Jae-Young, "QoS Provisioning for Video Streaming Over IEEE 802.11 Wireless LAN," (abridged) IEEE Conferences in Consumer Electronics, Jun. 16, 2003, EE Times, Seoul, Korea, <http://eetimes.com/printableArticle?doc_id=OEG2003061S0070> retrieved Jul. 8, 2003.

Youn, Jeongnam et al., "Video Transcoding For Multiple Clients," Proceedings of the SPIE, Bellingham, VA, vol. 4067, XP008012075, pp. 76-85, University of Washington, Sealttle, WA.

Lengwehasatit, Krisda et al.. "Computationally Scalable Partial Distance Based Fast Search Motion Estimation," Packet Video Corp., San Diego, California.

Takahashi, Kuniaki, et al., "Motion Vector Synthesis Algorithm for MPEG2-to-MPEG4 Transcoder," Proceedings of the SPIE, Bellingham, VA, vol. 4310, Sony Corporation, XP008000078, pp. 387-882, 2001 SPIE.

Soares, Luis Ducla, et al., "Influence of Encoder Parameters on the Decoded Video Quality for MPEG-4 Over W-CDMA Mobile Networks," NTT DoCoMo, Inc.

Aggarwal, Manoj et al., "Efficient Huffman Decoding," 2000 IEEE, 0-7803-6297-7, pp. 936-939, University of Illinois at Urbana-Champaign, Urbana, IL.

Sherwood, P. Greg et al., "Efficient Image and Channel Coding for Wireless Packet Networks," University of California, La Jolla, California.

Assuncao, Pedro et al., "Rate Reduction Techniques for MPEG-2 Video Bit Streams," SPIE, vol. 2952, Apr. 1996, pp. 450-459, University of Essex, Colchester, England.

Yin, Peng et al., "Video Transcoding by Reducing Spatial Resolution," Princeton University, 2000, Princeton, New Jersey.

Shanableh, Tamer et al., "Heterogeneous Video Transcoding to Lower Spatio-Temporal Resolutions and Difference Encoding Formats," IEEE Transactions on Multimedia, vol. 2, No. 2, Jun. 2000, pp. 101-110, Engineering and Physical Science Researc Counsel, Colchester, U.K.

Wiegand, Thomas et al., "Long-Term Memory Motion-Compensated Prediction for Robust Video Transmittion," in Proc. ICIP 2000, University of Erlangen-Buremberg, Erlangen, Germany.

Fan, Zhigang et al. "Maximum Likelihood Estimation of JPEG Quantization Table in the Identification of Bitmap Compression History," Xerox Corporation, Webster, New York.

Thomas, Shine M. et al., "An Efficient Implentation of MPEG-2 (BC1) Layer 1 & Layer 2 Stereo Encoder on Pentium-III Platform", pp. 1-10, Sasken Communication Technologies Limited, Bangalore, India.

Ramanujan, Ranga S. et al., "Adaptive Streaming of MPEG Video Over IP Networks," 22nd IEEE Conference on Local Computer Networks (LCN '97), Nov. 2-5, 1997 IEEE. pp. 398-409, Architecture Technology Corporation, Minneapolis, MN.

ReJaie, Reza et al., "Architectural Considerations for Playback of Quality Adaptive Video Over the Internet," XP002177090, 2000 IEEE pp. 204-209, AT&T Labs, Menlo Park, California.

Bouras, C. et al., "On-Demand Hypermedia/Multimedia Service Over Broadband Networks," XP-002180545, 1996 IEEE Proceedings of HPDC-5 '96, pp. 224-230, University of Patras, Patras, Greece.

Chalidabhongse, Junavit et al., "Fast Motion Vector Estimation Using Multiresolution-Spatio-Temporal Correlations," IEEE Transactions On Circuits and Systems For Video Technology, vol. 7, No. 3 Jun. 1997, pp. 477-488.

Oh, Hwang-Seok et al., "Block-Matching Algorithm Based On An Adaptive Reduction of the Search Area For Motion Estimation," Real-Time Imaging, Academic Press Ltd., vol. 56, No. 5, Oct. 2000, pp. 407-414, XP004419498 ISSN: 1077-2014 , Taejon, Korea.

Lee, Liang-Wei et al., "Dynamic Search-Window Adjustment and Interlaced Search for Block-Matching Algorithm," IEEE Transactions On Circuits and Systems for Video Technology, IEEE, vol. 3, No. 1, Feb. 3, 1993, pp. 85-87, XP000334581 ISSN: 1051-8215, New York.

Fukunaga, Shigeru et al., "MPEG-4 Video Verification Model Version 16.0" International Organization for Standardization: Coding of Moving Pictures and Audio, vol. N3312, Mar. 2000, pp. 1-380, XP000861688.

Kroner, Sabine et al., "Edge Preserving Noise Smoothing With An Optimized Cubic Filter," DEEI, University of Trieste, Trieste, Italy.

Kim, Jaemin et al., "Spatlotemporal Adaptive 3-D Kalman Filter for Video," pp. 1-12, Samsung Semiconductor, Inc. San Jose, Calfiornia.

Liu, Julia J., "ECE497KJ Course Project: Applications of Wiener Filtering In Image and Video De-Noising," pp. 1-15, May 21, 1997.

Jostschulte, K. et al., "A Subband Based Spatio-Temporal Noise Reduction Technique for Interlaced Video Signals," University Dortmund, Dortmund, Germany.

Kossentini, Faouzi et al. "Predictive RD Optimized Motion Estimation for Very Low Bit-Rate Video Coding," 1997 IEEE, XP-000726013, pp. 1752-1963, Sep. 1, 1996, 1997 International Conference on Image Processing, Vancouver, Canada.

Tourapis, Alexis et al. "New Results on Zonal Based Motion Estimation Algorithms—Advanced Predictive Diamond Zonal Search," 2001 IEEE, pp. V 183-V 186, The Hong Kong University of Science and Technology, Clear Water Bay, Kowloon, Hong Kong.

Brandenburg, Karlheinz, "MP3 and AAC Explained," Proceedings of AES 17th International Conference, XP008004053, pp. 99-110, Erlangen, Germany.

Painter, Ted et al., "Perceptual Coding of Digital Audio," Proceedings of the IEEE, vol. 88, No. 4, Apr. 2000, pp. 451-513, XP001143231, ISSN: 0018-9219, Arizona State University, Tempe, AZ.

Hassanzadegan, Hooman et al., "A New Method for Clock Recovery in MPEG Decoders," pp. 1-8, Basamad Negar Company, Tehran, Iran.

Kan, Kou-Sou et al., "Law-Complexity and Low-Delay Video Transcoding for Compressed MPEG-2 Bitstream," Natinal Central University, Chung-Li, Taiwan.

Mitchell et al., "MPEG Video Compression Standard: 15.2 Encorder and Decorder Buffering," Chapman and Hall Digital Multimedia Standards Series, pp. 340-356, XP002115299, ISBN: 0-412-08771-5, Chapman and Hall, New York.

Whybray, M.W. et al., "Video Coding—Techniques, Standards and Applications," BT Technol J. vol. 14, No. 4, Oct. 4, 1997, pp. 86-100, XP000722036.

"SHARP Product Information: VTST-Series NTSC/PAL Electronic Television Tuners," RFComponents Group, Sharp Microelectronics of the America, 1997.

Edwards, Larry M., "Satisfying Your Need for Net Speed," San Diego Metropolitan, Sep. 1999, <<www.sandiegometro.com/1999/sept/speed.html>>, retrieved on Jul. 19, 2001.

Oz, Ran et al., "Unified Headend Technical Management of Digital Services," BigBend Networks, Inc.

Muriel, Chris, "What is Digital Satellite Television?," What is Digital Television Rev. 3.0, Apr. 21, 1999, SatSure, Sandbach, England, <<http://www.netcentral.co.uk/satcure/digifaq.htm>>, access on Apr. 20, 2001.

"CONEXANT Products & Tech Info: Product Briefs: CX24108," 2000-2002 Conexant Systems, Inc. access on Apr. 20, 2001.

"CONEXANT Products & Tech Info: Product Briefs: CX22702," 2000-2002 Conexant Systems, Inc. access on Apr. 20, 2001.

"TDC: Components for Modems & Digital Infotainment: Direct Broadcast Satellite Chipset," 2001 Telecom Design Communications Ltd., U.K., <<http://www.tdc.co.uk/modmulti/settop/index.htm>>, access on Apr. 20, 2001.

"White Paper: Super G: Maximizing Wireless Performance," Mar. 2004, Atheros Communications, Inc., pp. 1-20, Document No. 991-00006-001, Sunnyvale, California.

Kwok, Y.K. et al., "Efficient Multiple Access Control Using a Channel-Adaptive Protocol for a Wireless ATM-Based Multimedia Services Network," Mar. 29, 2000, Computer Communications 24(2001) 970-983, University of Hong Kong, Hong Kong, PRC.

Liang, Ying-Chang et al., "Joint Downlink Beamforming, Power Control, and Data Rate Allocation for DS-CDMA Mobile Radio with Multimedia Services," 2000 IEEE, pp. 1455-1457, Ceneter for Wireless Communication, Singapore.

Razavi, Behzad, "Challenges in Portable RF Transceiver Design," Sep. 1996, 1996 IEEE, pp. 12-25, Circuits & Devices.

Mannion, Patrick, "IceFyre Device Cools 802.11a Power Consumption," Sep. 24, 2001, Planet Analog, National Semiconductor, <<http://www.planetanalog.com/story/OEG20010924S0079>>. access on Nov. 5, 2001.

"ICE Fyre Semiconductor: IceFyre 5-GHz OFDM Modem Solution," Sep. 2001, pp. 1-6, ICEFYRE: Rethink Wireless, IceFyre Semiconductor, Inc.

Pozar, David M., "Theory and Design of Ferrimagnetic Components," 1990, pp. 529, Microwave Engineering, Addison-Wesley Publishing Company, Inc.

"Part 11: Wireless LAN Medium Access Control (MAC) and Physical Layer (PHY) Specifications: High-Speed Physical Layer in the 5 GHz Band," 1999 IEEE, pp. 1-83, Supplement to IEEE Standard to rinformation Technology, IEEE Std 802.11a-1999, LAN/MAN Standards Committee.

Ciciora, Walter S., "Cable Television in the United States: An Overview," May 25, 1995, pp. 1-90, Cable Television Laboratories. Inc., Louisville, Colorado.

Pedro Assuncao and Mohammad Ghanbari, "Rate Reduction Techniques for MPEG-2 Video Bit Streams," SPIE vol. 2952, Apr. 1996, 10 pp.

Jae-Young Pyun, "QoS Provisioning for Video Streaming over IEEE 802.11 Wireless LAN," (abridged) IEEE Conference in Consumer Electronics, Jun. 16, 2003, 3 pp. [online] Retrieved from the Internet Jul. 8, 2003 at URL.

Krisda Lengwehasatit and Antonio Ortega, "Computationally Scalable Partial Distance Based Fast Search Motion Estimation," Univ. of Southern California, 4 pp., (date unknown).

Manoj Aggarwal and Ajai Narayan, "Efficient Huffman Decoding," 2000 IEEE, 0-7803-6297-7, pp. 936-939.

Peng Yin et al., "Video Transcoding by Reducing Spatial Resolution," Princeton University, Princeton, NJ, 4 pp., 2000.

Zhigang Fan and Ricardo de Queiroz, "Maximum Likelihood Estimation of JPEG Quantization Table in the Identification of Bitmap Compression History," Xerox Corporation, Webster, NY, 4 pp. (date unknown).

Louis Ducla Soares et al., "Influence of Encoder Parameters on the Decoded Video Quality for MPEG-4 Over W-CDMA Mobile Networks," NTT DoCoMo, Inc. technical paper, 4 pp. (date unknown).

Thomas Wiegand et al., "Long-Term Memory Motion-Compensated Prediction for Rubust Video Transmission," in Proc. ICIP2000, 4 pp.

P. Greg Sherwood et al., "Efficient Image and Channel Coding for Wireless Packet Networks," Univ. of CA, San Diego, CA, Dept. of ECE; 4 pp. (date unknown).

Donghoon Yu et al., "Fast Motion Estimation for Shape Coding in MPEG-4," 2003 IEEE Transactions on Circuits and Systems for Video Technology, vol. 13, No. 4, Apr. 2003, pp. 358-363.

Shine M. Thomas, Rahul Kumar & Vasudha Bhat, "An Efficient Implentation of MPEG-2 (BC1) Layer 1 & Layer 2 Stereo Encoder on Pentium-III Platform", Sasken Communication Technologies Limited, Banalore, India, pp. 1-10.

* cited by examiner

METHOD AND SYSTEM FOR SCALING IMAGES

BACKGROUND

Scaling images is known to accommodate display of an image at an output resolution that is different than the images input resolution. Typically, a large number of filter taps for a single phase filter or a large number of phases for a polyphase filter are needed to accommodate scaling over a wide range of resolutions. Single phase filters usually require much more processing power and memory than polyphase filters. But the large number of phases required for a polyphase filter may still be too expensive for practical implementations. For example, to accommodate downscaling from 720 to lower resolution that is a multiple of 16, without any phase distortion, requires storing coefficients of up to 44 phases, and each of these phases contains a number of filter taps. A method and/or system capable of providing high quality scaling of any scaling ratio with constrained resources would be useful.

FIELD OF THE DISCLOSURE

The present disclosure relates generally to image/video processing and more specifically to scaling of image/video.

BRIEF DESCRIPTION OF THE DRAWINGS

The present disclosure may be better understood, and its advantages made apparent to those skilled in the art by referencing the accompanying drawings.

The use of the same reference symbols in different drawings indicates similar or identical items.

DESCRIPTION OF THE PREFERRED EMBODIMENT(S)

A method of scaling images is disclosed in accordance with a specific embodiment of the disclosure. The method provides lossless scaling or scaling having low-level phase distortion for all resolutions.

Figure 1:
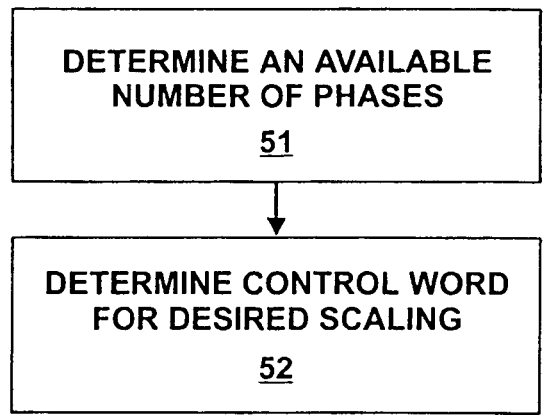
FIG. 1 illustrates in flow diagram form a method in accordance with the present disclosure.

FIG. 1 illustrates, in flow diagram form, a method in accordance with a specific embodiment of the present disclosure. At step 51, a number of phases to be made available for scaling is determined. Typically, the number of available phases will be selected deterministically based upon a desired level of quality needed. For example, for purposes of illustration herein, it has been determined that there are to be seventeen (17) available phases. These seventeen phases, or a subset of the seventeen phases, will be used to scale images of any resolution. Because of the symmetric nature of the phases, nine sets of coefficients (Filter Phases) can be provided to support the 17 available phases. This results in an amount of memory needed to support implementing the available phases that is much less than that of the worst scenario that uses 44 phases to scale to any resolution that is a multiple of 16. It will be appreciated that the number of available phases selected can vary depending upon many different factors, such as a desired image quality and the range of resolutions supported.

Figure 2:
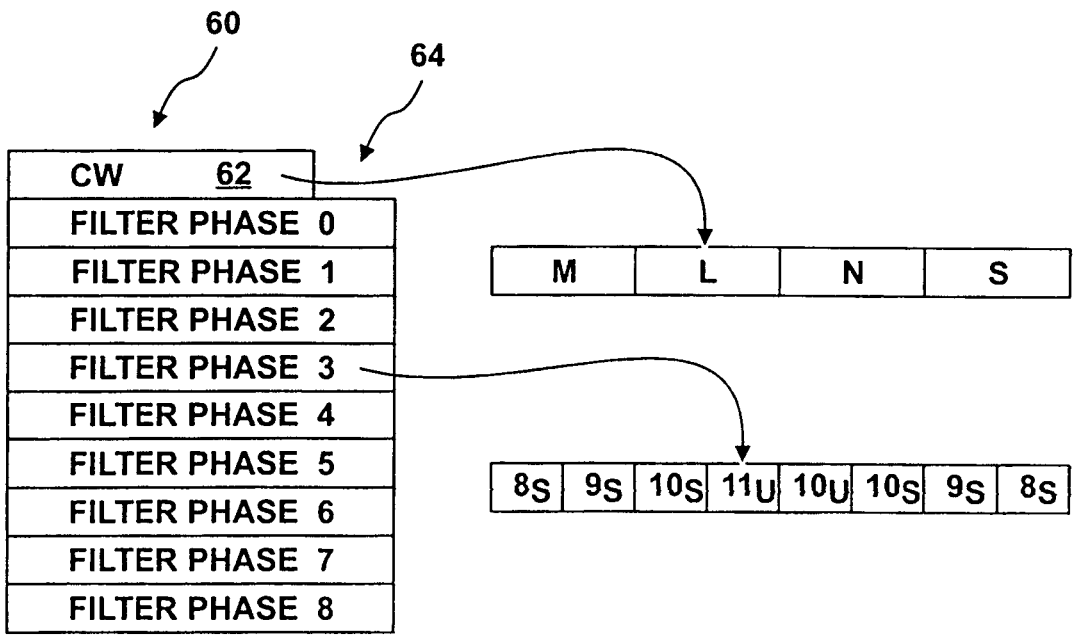
FIG. 2 illustrates a data structure in accordance with the present disclosure.

At step 52, a control word to be accessed by a scaler is determined. FIG. 2 illustrates a data structure 60 that includes control word (CW) 60 and coefficients for a plurality of filter phases 64. The control word 60 includes a plurality of variables, including: a number of input pixels in a scaling cycle (M), a number of output pixels in a scaling cycle (L), a number of used phases (N), and a shift variable S. The variables associated with control word 60 are better understood with reference to FIG. 3.

Figure 3:
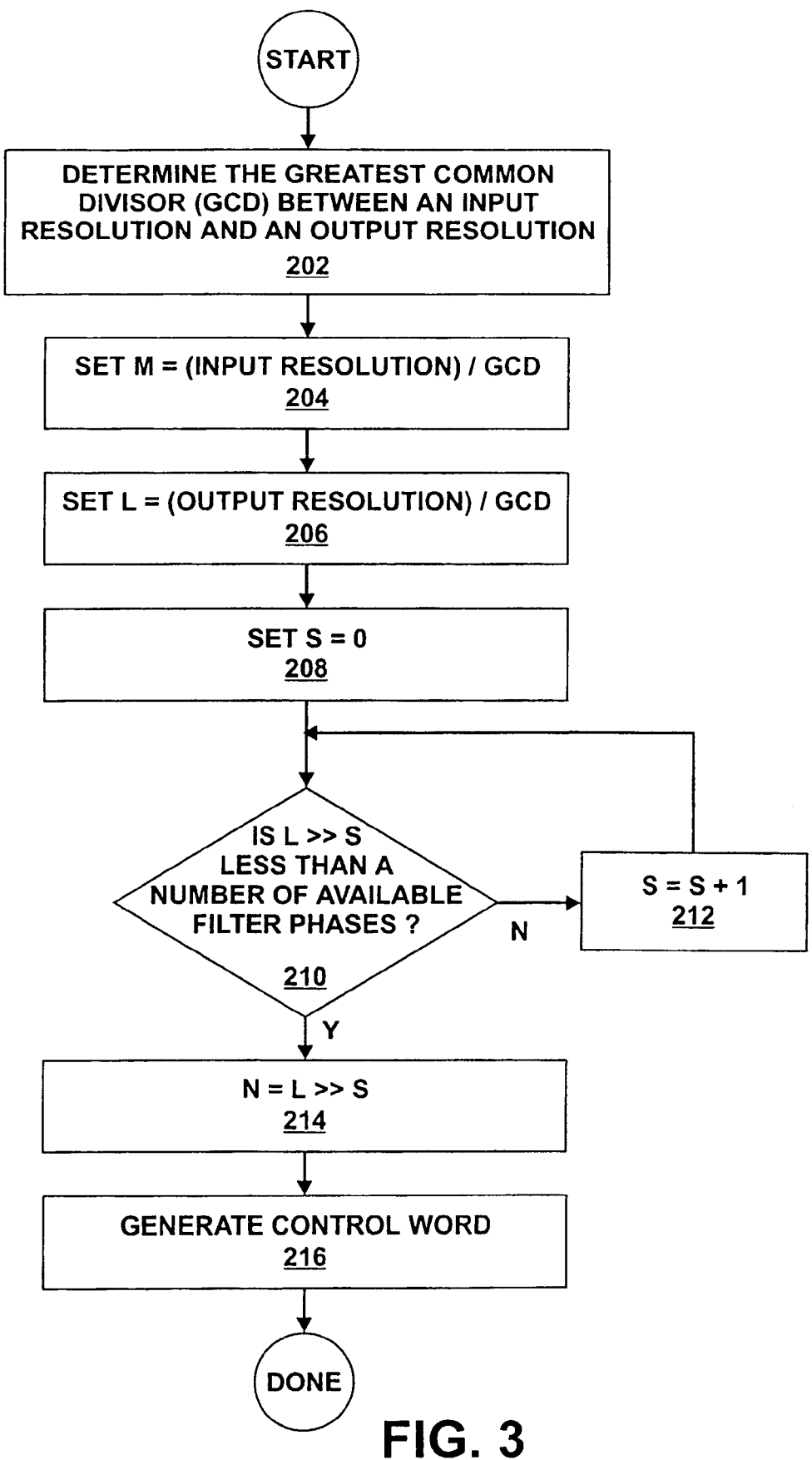
FIG. 3. illustrates a flow diagram for a method in accordance with the present disclosure.

At step 202, of FIG. 3, an input resolution and an output resolution is determined and a greatest common denominator (GCD) of the input and output resolution is determined. Typically the input resolution is determined by accessing a register location or receiving the resolution as part of a video stream, or video file. The output resolution is typically determined by accessing a register, or receiving the value from a display driver. Assuming an input resolution of 720 pixels, and an output resolution of 704 pixels, there is a GCD of 16. For purposes of discussion, the horizontal dimension of an image is discussed herein At step 204, the variable M is set to the value derived from dividing the input resolution by the GCD. Based upon the example illustrated, M=(720/16), or 45. The value 45 represents the number of input pixels that are scaled during a scaling cycle. At step 206, the variable L is set to the value derived by dividing the output resolution by the GCD. Based upon the example illustrated, L=(704/16), or 44. The value 44 represents the number of pixels generated during a scaling cycle. A scaling cycle represents a scaling operation that is repeated, such that each cycle accesses a common set of filter phases to scale M input pixels to generate L output pixels. In the illustrated example, each scaling cycle will result in 45 input pixels being scaled to 44 output pixels. In order to scale an entire line of 720 pixels, 16 scaling cycles are implements.

Steps 208, 210, and 212 determine a value of the shift variable S. At step 208 S is initialized to zero. At step 210, a determination is made whether a result of right-shifting the binary representation of the number of output pixels (L) by the value of S results in a value that is less than the number of available phases, or seventeen (17) in the present example. For example, when S is equal to zero, the binary value of the number of input pixels is, in effect, not right-shifted, resulting in a decimal value of 44. Since 44 is not less than the number of available phases, seventeen, the flow proceeds to step 212, where the shift value S is incremented by one.

Flow proceeds from step 212 to step 210, where a determination is made whether the binary representation of L right-shifted by the current value of S, now one, is less than the number of available phases. For example, during the current loop, when S is equal to one, the binary value of the number of output pixels in one scaling cycle (0010 1100) is shifted by one, resulting in a value of '0001 0110' or decimal 22. Since 22 is not less than the number of available phases, seventeen, the flow proceeds again to step 212, where the shift value S is incremented by one. This next loop, with S equal to two, results in a shifted binary value of '0000 1011', or decimal 11. Since 11 is less than the number of available phases, decimal seventeen, the value of S is determined and flow proceeds to step 214.

At step 214, the number of used phases (N) is determined by right-shifting the binary representation of L by the value of S.

It will be appreciated that in one embodiment each of the values of M, L, N, and S are provided as part of the control word 60. However, it will also be appreciated that only two of the variables L, N and S need to be provided as part of the control word N. By providing only two variables, the third, unprovided, variable can be derived using the equation N=L>>S, where ">>" indicates a number of right-shifts (S) to apply to the binary representation of L. Possible control word variables, therefore, include providing any one of the variable sets MLNS, MLN, MLS, and MNS.

Figure 4:
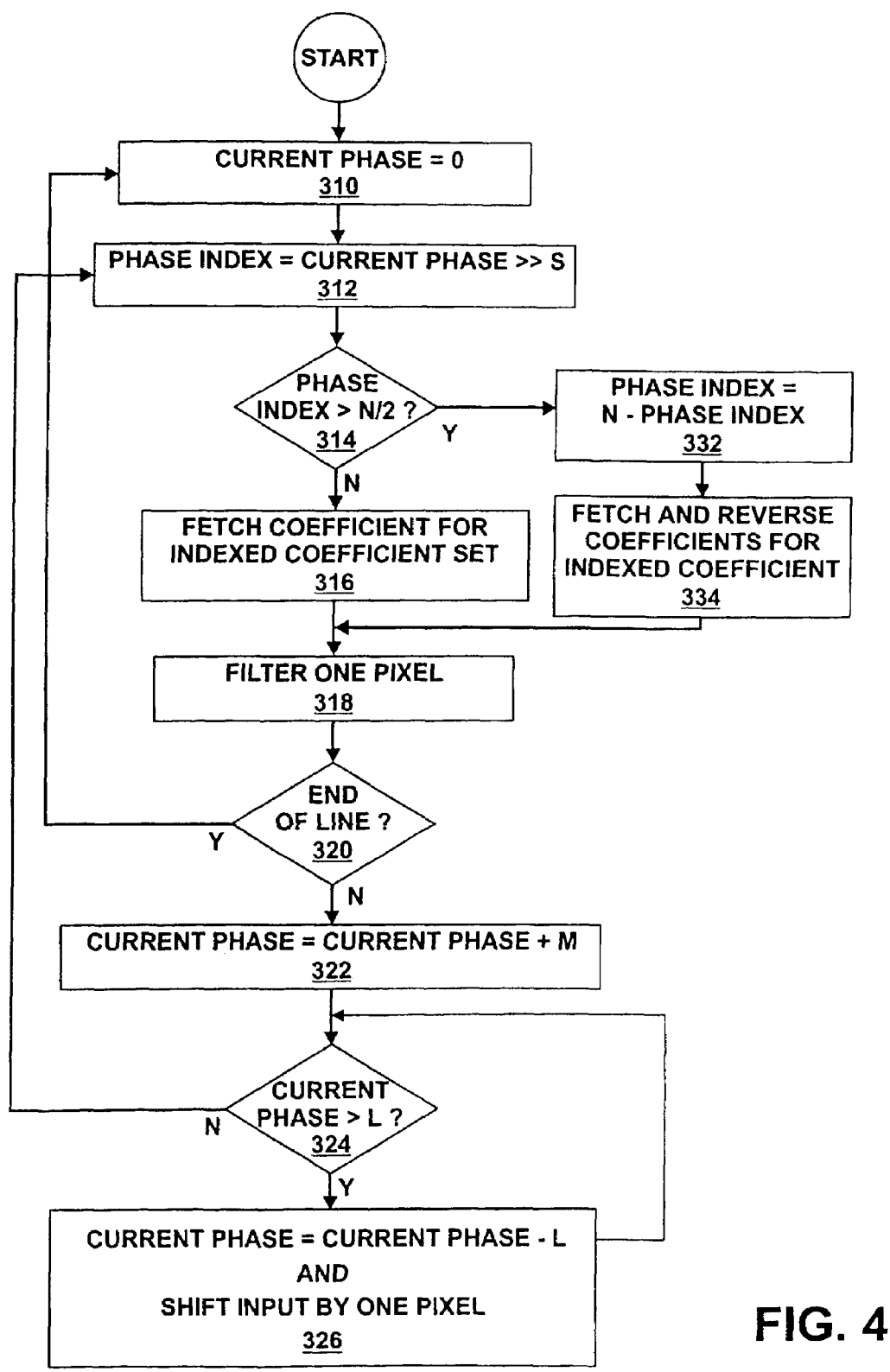
FIG. 4 illustrates a specific embodiment of a method in accordance with the present disclosure.

Once the control word variables are known, whether provided, or provided and calculated, as described above, the method described in FIG. 4 can be used to scale an image. The method of FIG. 4 is discussed with references to scaling in a horizontal dimension by implementing one or more scaling cycles. For example, sixteen scaling cycles are used to scale 720 pixels to 704 pixels, each scaling cycle generating 44 output pixels. Each scaling cycle accesses the FILTER PHASES 64 in a common sequence.

Initially, at step 310, a current phase variable, labeled CURRENT_PHASE, is set to zero. At step 212, a phase index variable, labeled PHASE_INDEX, is set equal to the binary representation of CURRENT_PHASE right shifted by value of S. The value of PHASE_INDEX is less than or equal to the number of available phases, and is used to access a specific set of phase coefficients from the data structure 60 to be used during the current phase scaling.

At step 314, a determination is made whether the PHASE_INDEX is greater than the number of used phases (N) divided by two (N/2). If so, the flow proceeds to step 332, otherwise the flow proceeds to step 316.

When the PHASE_INDEX is greater than N/2, the set of coefficients to be used for the current phase scaling needs to be accessed from a mirrored location. The value of PHASE_INDEX is mirrored at step 332 by subtracting PHASE_INDEX from the number of used phases (N). For example, for a used number of phases equal to 11, a PHASE_INDEX of eight would be mirrored resulting in a PHASE_INDEX equal to three (11−8=3). Referring to FIG. 2, this would result in the coefficients of FILTER PHASE 3 being accessed during the scaling of a current pixel.

Once the mirrored location is accessed, the flow proceeds to step 314, where the coefficients accessed from the mirrored location are reversed prior to use.

When the PHASE_INDEX is not greater than N/2, the set of coefficients to be used for scaling is accessed from a direct location at step 316. For example, given a used number of phases equal to 11, a PHASE_INDEX of 4 would result in a direct access of the coefficients of FILTER PHASE 4, as opposed to an access from a mirror location.

At step 318, a filter with the selected phase is used to filter one pixel, resulting in a scaled pixel. The specific implementation illustrated in FIG. 2 provides eight coefficients with each FILTER PHASE 64 for use by an eight-tap filter that performs the scaling. The eight coefficients illustrated in FIG. 2 include two eight-bit signed coefficients, two nine-bit signed coefficients, two ten-bit signed coefficients, one ten-bit unsigned coefficient, and one eleven-bit unsigned coefficient. As previously discussed, when a phase is mapped to its symmetric (mirrored) position, the coefficients at the mirror location need to be reversed from left to right. The left center is an eleven-bit unsigned coefficient to handle the no scaling case. More specifically, the normalized value of all the coefficients (the sum of all the coefficients) is eleven-bit in this specific design. When there is no scaling, normalized value is placed into the left center.

At step 120, a determination is made whether an end of line has been reached. If so, the flow proceeds to step 310 and scaling of a new line begins.

Steps 322, 324, and 326 determine a next value for the CURRENT_PHASE variable. At step 322 the CURRENT_PHASE is incremented by the number of input pixels M. At step 324 a determination is made whether CURRENT_PHASE is greater than the number of output pixels L. If not greater than the variable L, the flow proceeds to step 312, and the previously discussed steps are repeated. If CURRENT_PHASE is greater than the variable L the flow proceeds to step 326 where CURRENT_PHASE is decremented by the variable L, and the input is shifted by one pixel. Once decremented, the flow proceeds to step 324. Once a CURRENT_PHASE value that is not greater than L is achieved, the flow proceeds to step 312, and a new set of coefficients is selected in the manner previously discussed.

The method of FIG. 4 has been found to be an efficient scaling implementation. Different control words and filter phases can be provided or accessed to implement scaling of different quality levels. While the specific example discussed herein dealt with horizontal scaling, similar techniques can be used to implement vertical scaling. In other embodiments, different scaling techniques can be used with respect to vertical scaling.

Figure 5:
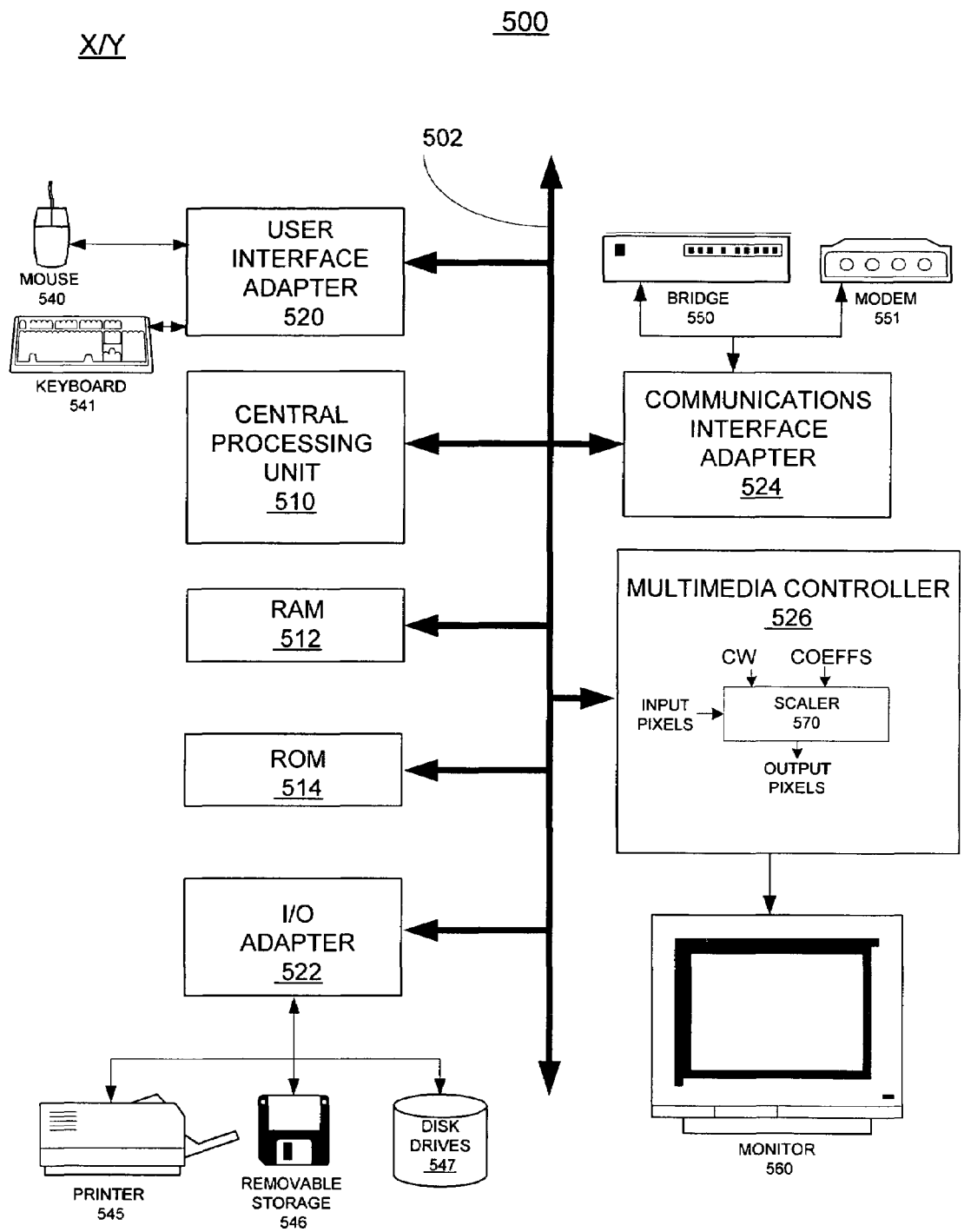
FIG. 5 illustrates a specific embodiment of a system in accordance with the present disclosure.

FIG. 5 illustrates, in block diagram form, a data processing system that may represent a general purpose processing system, such as a personal computer or a personal digital assistant, or an application specific system such as a media server, internet appliance, home networking hubs, and the like. The system 500 is illustrated to include a central processing unit 510, which may be a conventional or proprietary data processor, memory including random access memory 512, read only memory 514, input output adapter 522, a user interface adapter 520, a communications interface adapter 524, and a multimedia controller 526.

The input output (I/O) adapter 526 can be further connected to various peripherals such as disk drives 547, printer 545, removable storage devices 546, as well as other standard and proprietary I/O devices.

The user interface adapter 520 can be considered to be a specialized I/O adapter. The adapter 520 is illustrated to be connected to a mouse 540, and a keyboard 541. In addition, the user interface adapter 520 may be connected to other devices capable of providing various types of user control, such as touch screen devices.

The communications interface adapter 524 is connected to a bridge 550 such as is associated with a local or a wide area network, and a modem 551. By connecting the system bus 502 to various communication devices, external access to information can be obtained.

The multimedia controller 526 will generally include a video graphics controller capable of generating scaled images that can be displayed, saved, or transmitted. The specific embodiment illustrated illustrates the multimedia controller including a scaler 570 that can be used to implement the methods described herein. It will be appreciated the methods described can be implemented, by the scaler in hardware and/or software. Software implementations can be stored in any on of various memory locations, including RAM 512 and ROM 514, in addition software implementation software can be stored in the multimedia controller 526. When implemented in software, the scaler may be a data processor within the controller 526 for executing instruction, or it maybe a shared processor, such as CPU 510.

The elements associated with data structure 60, as described with reference to FIG. 2, can be provided via a storage media, such as floppy 546, Disk Drives 547, or from remote storage devices. The output pixels generated by scaler 570 can be provided to Monitor 560, stored for later display or subsequent processing, or transmitted to a different system. In another embodiment, the scaler 570 can be part of an encoder that generates scaled images for transmission. The input video can be received at a receiver that is part of Multimedia Controller 526, through the Bridge 550 or modem 551, or accessed from a stored memory location. Control words, and coefficients and input pixels can be accessed from system memory locations.

The preceding detailed description of the figures, reference has been made to the accompanying drawings which form a part thereof, and to which show by way of illustration specific embodiments in which the invention may be practiced. It will be appreciated that many other varied embodiments that incorporate the teachings herein may be easily constructed by those skilled in the art. Accordingly, the present disclosure is not intended to be limited to the specific form set forth herein, but on the contrary, it is intended to cover such alternatives, modifications, and equivalents, as can be reasonably included within the spirit and scope of the invention. The preceding detailed description is, therefore, not to be taken in a limiting sense, and the scope of the present disclosure is defined only by the appended claims.

What is claimed is:

1. A method comprising:
incrementing a current phase location within a scaling cycle by a first value to obtain a first adjusted value, the first value equal to a number of input pixels in the scaling cycle, wherein the scaling cycle represents a scaling operation that is repeated, such that each scaling cycle accesses a common set of filter phases to scale the number of input pixels to obtain a number of output pixels, where the number of input pixels in the scaling cycle is equal to an input resolution divided by a GCD and the number of output pixels in the scaling cycle is equal to an output resolution divided by the GCD, where the GCD is the greatest common divisor of the input resolution and output resolution;
decrementing, in response to the first adjusted value being greater than a second value, the first adjusted value by the second value one or more times to obtain a second adjusted value less than the second value, the second value equal to the number of output pixels in the scaling;
determining an index value to access a coefficient set of a filter phase of the common set of filter phases by right shifting a binary representation of the second adjusted value a predetermined amount;
accessing, at a data processor, the coefficient set based on the index value;
filtering based upon the coefficient set to determine a scaled pixel value; and
outputting the scaled pixel value from the data processor.

2. The method of claim 1 further comprising:
in response to the index value being within a first range, accessing the coefficient set from a mirror location of the common set of filter phases; and
in response to the index value being within a second range, accessing the coefficient set from a direct location.

3. The method of claim 2 wherein determining the scaled pixel value further comprises reversing the coefficients in response to the coefficient set being accessed from the mirror location.

4. The method of claim 1 further comprising:
receiving the predetermined amount from a control word.

5. The method of claim 1 further comprising:
determining the predetermined amount from a control word.

6. A video scaler comprising:
a means for incrementing a current phase location within a scaling cycle by a first value to obtain a first adjusted value, the first value equal to a number of input pixels in the scaling cycle, wherein the scaling cycle represents a scaling operation that is repeated, such that each scaling cycle accesses a common set of filter phases to scale the number of input pixels to obtain a number of output pixels, where the number of input pixels in the scaling cycle is equal to an input resolution divided by a GCD and the number of output pixels in the scaling cycle is equal to an output resolution divided by the GCD, where the GCD is the greatest common divisor of the input resolution and output resolution;
a means for decrementing, in response to the first adjusted value being greater than a second value, the first adjusted value by the second value one or more times, to obtain a second adjusted value less than the second value, the second value equal to the number of output pixels in the scaling cycle;
a means for determining an index value to access a coefficient set of a filter phase of the common set of filter phases by right shifting a binary representation of the second adjusted value a predetermined amount;
a means for accessing the coefficient set based on the index value;
a means for filtering based upon the coefficient set to determine a scaled pixel value; and
a means for outputting the scaled pixel value.

7. A system comprising:
a data processor for executing instructions; and
a memory for storing the instructions, the instructions to:
increment a current phase location within a scaling cycle by a first value to obtain a first adjusted value, the first value equal to a number of input pixels in the scaling cycle, wherein the scaling cycle represents a scaling operation that is repeated, such that each scaling cycle accesses a common set of filter phases to scale the number of input pixels to obtain a number of output pixels, where the number of input pixels in the scaling cycle is equal to an input resolution divided by a GCD and the number of output pixels in the scaling cycle is equal to an output resolution divided by the GCD, where the GCD is the greatest common divisor of the input resolution and output resolution;
decrement, in response to the first adjusted value being greater than a second value, the first adjusted value by the second value one or more times to obtain a second adjusted value less than the second value, the second value equal to the number of output pixels in the scaling cycle;
determine an index value to access a coefficient set of a filter phase of the common set of filter phases by right shifting a binary representation of the second adjusted value a predetermined amount;
filter based upon the coefficient set to determine a scaled pixel value; and
output the scaled pixel value.

8. A computer readable storage medium encoded with computer executable instructions causing a computer to perform the operations that:
- increment a current phase location within a scaling cycle by a first value to obtain a first adjusted value, the first value equal to a number of input pixels in the scaling cycle, wherein the scaling cycle represents a scaling operation that is repeated, such that each scaling cycle accesses a common set of filter phases to scale the number of input pixels to obtain a number of output pixels, where the number of input pixels in the scaling cycle is equal to an input resolution divided by a GCD and the number of output pixels in the scaling cycle is equal to an output resolution divided by the GCD, where the GCD is the greatest common divisor of the input resolution and output resolution;
- decrement, in response to the first adjusted value being greater than a second value, the first adjusted value by the second value one or more times to obtain a second adjusted value less than the second value, the second value equal to the number of output pixels in the scaling cycle;
- determine an index value to access a coefficient set of a filter phase of the common set of filter phases by right shifting a binary representation of the second adjusted value a predetermined amount;
- filter based upon the coefficient set to determine a scaled pixel value; and
- output the scaled pixel value.

9. A method comprising:
- storing X sets of coefficients representing $2*(X-1)+1$ available filter phases, where X is a positive integer; and
- determining, based on a number of output pixels per scaling cycle and the $2*(X-1)+1$ available filter phases, a set of N filter phases used during a scaling cycle, where N is a positive integer, and the scaling cycle represents a scaling operation that is repeated, such that each scaling cycle accesses the set of N filter phases to scale a number of input pixels to obtain a number of output pixels, where the number of input pixels in the scaling cycle is equal to an input resolution divided by a GCD, the number of output pixels in the scaling cycle is equal to an output resolution divided by the GCD, where the GCD is the greatest common divisor of the input resolution and output resolution, and N is less than $2*(X-1)+1$;
- scaling each input pixel of the number of input pixels based on the set of N filter phases to obtain each output pixel of the number of output pixels; and
- outputting each output pixel of the number of output pixels from a data processor.

10. The method of claim 9 wherein the number N is equal to L>>S, where L is the output resolution divided by the GCD, and S is an integer indicating the number of times L needs to be right-shifted (>>) to have a value less than $2*(X-1)+1$.

11. The method of claim 9, wherein scaling the number of input pixels further comprises obtaining a first output pixel and a second output pixel of the number of output pixels based upon a first set of coefficients of the X sets of coefficients that represents a first filter phase and a second filter phase.

12. The method of claim 11, wherein the first output pixel is obtained by accessing the set of coefficients in a first order, and the second output pixel is obtained by accessing the set of coefficients in a second order that is a reverse of the first order.

* * * * *